United States Patent [19]

Pedginski et al.

[11] Patent Number: 5,145,718
[45] Date of Patent: Sep. 8, 1992

[54] PROCESSS FOR PRODUCING PRESSURE-SENSITIVE ADHESIVE TAPE

[75] Inventors: James J. Pedginski, Stillwater; Ronald B. Birkholz, White Bear Lake, both of Minn.

[73] Assignee: Minnesota Mining and Manufacturing Company, St. Paul, Minn.

[21] Appl. No.: 797,466

[22] Filed: Nov. 22, 1991

Related U.S. Application Data

[62] Division of Ser. No. 675,993, Mar. 26, 1991.

[51] Int. Cl.$^5$ .............................................. B05D 3/12
[52] U.S. Cl. ................................. 427/171; 427/173; 427/177; 427/208; 427/208.8; 427/316; 427/322; 427/346; 427/385.5; 427/400; 427/412.3; 427/412.5
[58] Field of Search ............... 427/171, 173, 177, 208, 427/208.8, 316, 322, 346, 385.5, 400, 412.3, 412.5

[56] References Cited

U.S. PATENT DOCUMENTS

| | | | |
|---|---|---|---|
| 2,532,011 | 11/1950 | Dahlquist et al. | 154/53.5 |
| 2,607,711 | 8/1952 | Hendricks | 117/122 |
| 3,239,478 | 3/1966 | Harlan | 260/27 |
| 3,281,383 | 10/1966 | Zelinski et al. | 260/23.7 |
| 3,318,852 | 5/1967 | Dixon | 260/78.5 |
| 3,519,585 | 7/1970 | Miller | 260/27 |
| 3,787,531 | 1/1974 | Dahlquist et al. | 260/876 |
| 4,137,362 | 1/1979 | Miki et al. | 428/337 |
| 4,173,676 | 11/1979 | Asakura et al. | 428/332 |
| 4,335,171 | 6/1982 | Zenk | 428/40 |
| 4,379,806 | 4/1983 | Korpman | 428/354 |
| 4,414,261 | 11/1983 | Nanbu | 428/213 |
| 4,451,533 | 5/1984 | Wong et al. | 428/337 |
| 4,513,028 | 4/1985 | Aritake | 427/173 |

FOREIGN PATENT DOCUMENTS

| | | |
|---|---|---|
| 46-21120 | 6/1972 | Japan. |
| 80178 | 10/1972 | Japan. |
| 37935 | 3/1976 | Japan. |
| 28793 | 4/1989 | Japan. |

OTHER PUBLICATIONS

*Handbook of Pressure Sensitive Adhesive Technology*, Second Edition, edited by Donatas Satas, Van Nostrand Reinhold (New York:1989), pp. 317-373.
"Pressure-Sensitive Tapes and Labels" in C. W. Bemmels, *Handbook of Adhesives*, edited by Irving Skeist, Van Nostrand Reinhold Company (1977), pp. 724-735.
*Handbook of Pressure Sensitive Adhesives Technology*, Second Edition, edited by Donatas Satas, Van Nostrand Reinhold (New York:1989), pp. 332-335.

(List continued on next page.)

Primary Examiner—Bernard Pianalto
Attorney, Agent, or Firm—Gary L. Griswold; Walter N. Kirn; David L. Weinstein

[57] ABSTRACT

A tape comprising a biaxially-oriented backing made from a polymeric film bearing on one major surface thereof a layer of pressure-sensitive adhesive and on the other major surface thereof a layer of low-adhesive backsize composition. The backing and the layer of pressure-sensitive adhesive intermix so as to form a commingled layer between them. This invention also provides a process of preparing pressure-sensitive adhesive tape comprising the steps of (1) providing an extruded polymeric film backing, (2) orienting said backing in the machine direction, (3) applying a low-adhesive backsize layer to one major surface of said backing, (4) applying a pressure-sensitive adhesive layer to the major surface of said backing not bearing the low-adhesion backsize layer, (5) orienting the layer-bearing backing in the transverse direction by heating and cross-stretching the layer-bearing backing, (6) winding the machine direction oriented, transverse direction oriented, layer-bearing backing onto a roll, and (7) optionally, converting the machine direction oriented, transverse direction oriented, layer-bearing backing to form a tape.

20 Claims, 1 Drawing Sheet

OTHER PUBLICATIONS

*Encyclopedia of Polymer Science and Engineering*, Second Edition, vol. 7, Wiley & Sons (1987), pp. 88–96.

*Encyclopedia of Polymer Science and Engineering*, Second Edition, John Wiley & Sons (New York:1986), vol. 6, pp. 1–51 and vol. 8, pp. 647–677.

"Thermoplastic Rubber in Adhesives", by J. T. Harlan et al., *Handbook of Adhesives*, edited by Irving Skeist, Van Nostrand Reinhold Co., New York, Second Edition (1977), pp. 304–330.

"Rubber-Related Polymers, I. Thermoplastic Elastomers" by W. R. Hendricks et al., *Rubber Technology*, edited by Maurice Morton, Van Nostrand Reinhold Co., New York (1973), pp. 515–533.

*Encyclopedia of Polymer Science and Engineering*, Second Edition, vol. 7, John Wiley & Sons (1987), pp. 96–98.

*Handbook of Pressure Sensitive Adhesive Technology*, Second Edition, edited by Donatas Satas, Van Nostrand Reinhold (New York:1989), pp. 792–798.

*Encyclopedia of Polymer Science and Engineering*, Second Edition, vol. 7, John Wiley & Sons, (1987) pp. 98–102.

*Handbook of Pressure Sensitive Adhesive Technology*, Second Edition, edited by Donatas Satas, Van Nostrand Reinhold (New York:1989), pp. 875–890.

PROCESSS FOR PRODUCING PRESSURE-SENSITIVE ADHESIVE TAPE

This is a division of application No. 07/675,993 filed Mar. 26, 1991.

BACKGROUND OF THE INVENTION

1. Field of the Invention

This invention relates to a pressure-sensitive adhesive tape, more particularly, a tape having a biaxially-oriented backing, and a process for preparing pressure-sensitive adhesive tapes.

2. Discussion of the Art

Normally tacky, pressure-sensitive adhesive tapes comprise a backing bearing on at least one major surface thereof a layer of pressure-sensitive adhesive. Pressure-sensitive adhesive tapes are usually prepared by a process in which a layer of pressure-sensitive adhesive is applied to one major surface of a backing and, optionally, a layer of low-adhesion backsize composition is applied to the other major surface of the backing. Preferred adhesives include rubber-based adhesives, which consist of a blend of natural or synthetic rubber and tackifier resin. While other resins and additives can also be included, the rubber and tackifier resin are essential. Conventional rubber-based adhesives do not adhere satisfactorily to most backings made from polymeric film, particularly polyolefin and poly(vinyl chloride). Although the use of thermoplastic-elastomeric block copolymers in the rubber constituent can provide improved anchorage to backings, special formulations are generally required, and, even then, high levels of anchorage may not be attainable with some polymeric films. Improved anchorage can be brought about through the use of primers, i.e., materials capable of adhering well to both the backing and the adhesive, or other treatments, to assure a high level of anchorage of the adhesive to the backing.

At present, pressure-sensitive adhesive tapes are typically manufactured by a process comprising the steps of:

(1) providing a biaxially-oriented polymeric backing;

(2) corona treating the major surfaces of the backing to improve the adhesion of the backing to subsequently applied coatings;

(3) applying a layer of pressure-sensitive adhesive to one major surface of the backing;

(4) applying a layer of low-adhesion backsize composition to the other major surface of the backing; and (5) winding the coated backing onto a jumbo roll, where it is stored until further converting is desired.

Japanese Patent Publication 46-21120 discloses a process for preparing a pressure-sensitive adhesive tape comprising the steps of (1) melt extruding a thermoplastic synthetic resin and an adhesive component separately as two flows; (2) guiding the two flows in a molten state to a single die to form a single fluid body comprising the thermoplastic synthetic resin at an inner wall and the adhesive component at an external wall; (3) extruding the single fluid body from the die; and (4) winding the tape in a roll-form. The adhesive component can contain a natural or synthetic rubber and a tackifier.

U.S. Pat. No. 4,379,806 (Korpman) discloses a pressure-sensitive adhesive tape comprising an adhesive layer of a normally tacky thermoplastic pressure-sensitive rubber resin, a backing layer of a normally non-tacky thermoplastic film, and an intermediate interlocking layer containing both components in a laminar relationship formed by coextending an adhesive compositions and a thermoplastic film-forming composition. The adhesive composition comprises (i) an elastomeric component and (ii) a tackifier resin component. The elastomeric component of the adhesive composition comprises an A-B-A block copolymer, A-B block copolymer, or mixtures thereof.

U.S. Pat. No. 4,513,028 (Aritake) discloses a process for producing an adhesive tape which comprises (1) forming an adhesive layer on one side of a base sheet of a polypropylene resin and a surface layer of a polypropylene resin having a melting point lower than that of the polypropylene resin of the base sheet and containing fine inorganic filler particles on the other side of the base sheet to obtain an unstretched laminated sheet, (2) stretching the laminated sheet at a temperature of at least the melting point of the polypropylene resin of the surface layer such that the thickness of the surface layer is not more than the maximum diameter of the particles it contains.

Japanese Patent Publication (Tokko): Hei 1 (1989) - 28793 discloses a method for producing an adhesive tape comprising the steps of laminating a modified polyolefin layer containing 0.01-10% by weight of unsaturated carboxylic acid or the anhydride thereof to one surface of a base polypropylene sheet, coating the modified polyolefin layer with a layer of a mixture of reactive acrylic adhesive and crosslinking agent, and subsequently heating and stretching the laminated sheet. It is stated that, if necessary, a back-side treating agent can be coated on the back surface of the polypropylene base sheet, preferably prior to the stretching step.

SUMMARY OF THE INVENTION

This invention provides a tape comprising a biaxially-orientated backing made from a polymeric film bearing on one major surface thereof a layer of pressure-sensitive adhesive and on the other major surface thereof a layer of low-adhesion backsize composition. The backing and the layer of pressure-sensitive adhesive intermix so as to form a commingled layer between them. The commingled layer is in contact with both the backing and the layer of pressure-sensitive adhesive. The commingled layer contains more than 0.5% but no more than 10% by weight tackifier resin. The commingled layer further contains at least 50%, preferably at least 70%, and more preferably at least 90% by weight of polymeric material from the backing. The commingled layer has a thickness ranging from about 0.1% to about 50%, preferably from about 1% to about 30%, and more preferably from about 3% to about 20%, of the thickness of the backing.

It is preferred that the low-adhesion backsize composition be the dried deposition product of an aqueous emulsion of a copolymer of monomers comprising (1) monomers having the structure:

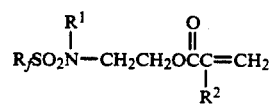

wherein $R_f$ represents a perfluoroalkyl group containing 5 to 12 carbon atoms, $R^1$ represents a lower alkyl radical containing 1 to 5 carbon atoms, and $R^2$ represents H or methyl, and (2) at least one substantially unsaturated polar functional monomer.

This invention further provides a process for preparing a pressure-sensitive adhesive tape, comprising the steps of:

(1) providing a backing made from a polymeric film, preferably by means of extrusion of a molten polymer;

(2) orienting said backing in the machine direction;

(3) applying a layer of low-emulsion backsize composition to one major surface of said oriented backing;

(4) applying a layer of pressure-sensitive adhesive to the major surface of said oriented backing not bearing the layer of low-adhesion backsize composition;

(5) orienting the layer-bearing backing in the transverse direction by heating and cross-stretching the layer-bearing backing in the transverse direction; and (6) winding the machine direction oriented, transverse direction oriented, layer-bearing backing onto a roll.

The machine direction oriented, transverse direction oriented, layer-bearing backing can subsequently be converted to form rolls of pressure-sensitive adhesive tape suitable for commercial purposes.

In the aforedescribed process, the layer of pressure-sensitive adhesive can be applied subsequent to, prior to, or at the same time as the application of the layer of low-adhesion backsize composition. However, it is preferable to apply the layer of pressure-sensitive adhesive subsequent to the application of the low-adhesion backsize composition. In any embodiment of the process, however, both the layer of pressure-sensitive adhesive and the layer of low-adhesion backsize composition must be applied subsequent to the machine direction orientation step and prior to the heating and cross-stretching step.

The process of this invention provides an adhesive tape having improved anchorage of the layer of pressure-sensitive adhesive to the polymeric film backing. An unexpected benefit of the process is that it also provides an adhesive tape having a low odor at room temperature, e.g., 25° C.

DETAILED DESCRIPTION OF THE INVENTION

Figures 1, 2:
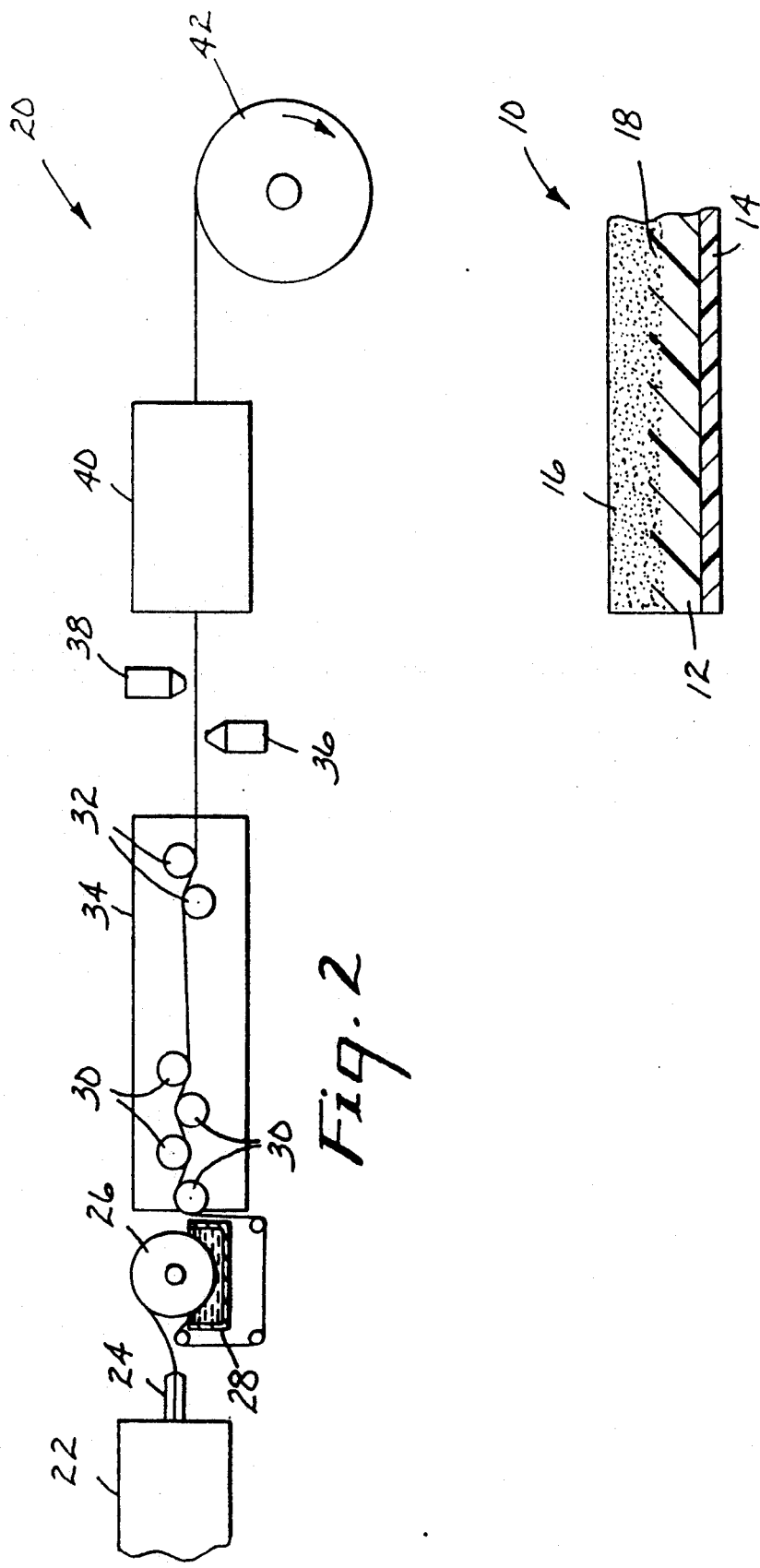
FIG. 1 is a diagrammatic cross-sectional view of the adhesive tape of the present invention.
FIG. 2 is a schematic diagram illustrating the process of the present invention.

FIG. 1 illustrate a tape 10 comprising a biaxially-oriented backing 12 made form a polymeric film, a layer of low-adhesion backsize composition 14, and a layer of pressure-sensitive adhesive 16. A portion of the layer of pressure-sensitive adhesive 16 and a portion of the backing 12 intermix to form a commingled layer 18. The commingled layer 18 is in contact with both the backing 12 and the layer of pressure-sensitive adhesive 16. The commingled layer 18 has a thickness ranging from about 0.1% to about 50%, preferably from about 1% to about 30%, more preferably from about 3% to about 20%, of the thickness of backing 12. The commingled layer 18 also contains more than 0.5% by weight but no more than 10% by weight, preferably no more than 5% by weight, more preferably no more than 3% by weight, of tackifier resin. The commingled layer 18 further contains at least 50%, preferably at least 70%, and more preferably at least 90% by weight of polymeric material from the backing 12.

The backing 12 can be formed from a wide variety of polymeric compositions capable of forming films, such as, for example, polyethylene, polypropylene, polystyrene, polyester, e.g., polyethylene terephthalate, poly(vinyl chloride), various thermoplastic block copolymers, and the like. The backing can be non-elastomeric. Preferred materials for non-elastomeric backings include polypropylene, polypropylene blended with small amounts, e.g., up to about 10% by weight, of other polyolefins, and copolymers of propylene and other alpha-olefins. The most preferred material for a non-elastomeric backing is semi-crystalline polypropylene having a melting point greater than about 160° C. The aforementioned polymeric materials are commercially available and may be used without modification or as modified in ways well known to one of ordinary skill in the art. For example, the compositions for preparing polymeric film backings can be modified with minor amounts of conventional modifiers, such as, for example, antioxidants, fillers, pigments, e.g., zinc oxide, titanium dioxide, calcium carbonate, hydrocarbon resins, etc.

It is preferred that the low-adhesion backsize composition of layer 14 be the dried deposition product of an aqueous emulsion of a copolymer of monomers comprising (1) at least one monomer having the structure:

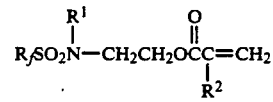

wherein $R_f$ represents a perfluoroalkyl group containing 5 to 12 carbon atoms, $R^1$ represents a lower alkyl radical containing 1 to 5 carbon atoms, and $R^2$ represents H or methyl, and (2) at least one substantially unsaturated polymer functional monomer. In most instances, the copolymer of the low-adhesion backsize composition will also include (3) at least one vinyl-functional monomer. Additionally, because the layer of low-adhesion backsize composition 14 is generally applied in the form of an aqueous emulsion, there may also be present a small amount of emulsifying agent.

An aqueous emulsion of a copolymer having particular utility in preparing the low-adhesion backsize composition comprising 100 parts by weight of monomers comprising (1) from about 30 to about 90 parts by weight of at least one monomer having the structure:

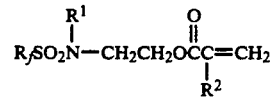

wherein $R_f$ represents a perfluoroalkyl group containing 5 to 12 carbon atoms, $R^1$ represents a lower alkyl radical containing 1 to 5 carbon atoms, and $R^2$ represents H or methyl and (2) from about 70 to about 10 parts by weight of at least one ethylenically unsaturated polar functional monomer. Preferably, the 100 parts of copolymer will also include (3) from about 5 to about 60 parts by weight of at least one vinyl-functional monomer.

In order to clarify the foregoing ratios, the following table may be beneficial:

| Type of monomer of copolymer | Parts by weight of each type of monomer of copolymer |
| --- | --- |
| Perfluoroalkyl group containing monomer or monomers | about 30 to about 90 |
| Ethylenically unsaturated polar functional monomer or monomers | about 70 to about 10 |
| Vinyl-functional monomer or monomers | about 5 to about 60 |

The polar functional monomers can be either carboxylic acids such as acrylic, methacrylic, crotonic, itaconic, and the like, or they can be acetoxyethyl methacrylate, acrylamide, methacrylamide, N-tert-butyl acrylamide, methoxyethyl acrylate, hydroxyethyl acrylate, hydroxyethyl methacrylate, and the like.

As indicated, it is often desirable to incorporate vinyl-functional monomers into the copolymer to enhance polymerization and promote latex stability. Among vinyl-functional monomers suitable for the copolymer are acrylates, methacrylates, styrene, and vinyl esters.

The low-adhesion backsize composition can be prepared by emulsion polymerization in which (1) the monomers, emulsifiers, and water are added to a reaction vessel, (2) the resulting mixture is heated at about 74° C. (164° F.), with agitation, until well blended, (3) the mixture then passed through a homogenizer, (4) the initiator added, and (5) the emulsion is then maintained at a temperature of about 74° C. (165° F.) until conversion is at least 98% complete. A more detailed discussion on emulsion polymerization and latices can be found in the *Encyclopedia of Polymer Science and Engineering*, Second Edition, John Wiley & Sons (New York:1986), Vol. 6, pages 1-51, and Vol. 8, pages 647-677.

Other low-adhesion backsize compositions can be used for layer 14. Examples of such compositions can be found in U.S. Pat. Nos. 2,607,711; 2,532,011; and 3,318,852, incorporated herein by reference. However, these compositions are less preferred than the composition that can be applied from an aqueous emulsion on the basis of manufacturing considerations.

The adhesive compositions that are preferred for the layer of pressure-sensitive adhesive 16 of the tape of this invention comprise an elastomeric component and a tackifier resin component, wherein the tackifier component is present in an amount of from about 20 to about 300 parts by weight, preferably 50 to about 150 parts by weight, per 100 parts by weight of the elastomeric component. Preferably, the elastomeric component comprises at least one thermoplastic-elastomeric block copolymer. The tackifier resin component preferably comprises a solid tackifier resin or resins.

Thermoplastic-elastomeric block copolymers suitable for the elastomeric component of the layer of pressure-sensitive adhesive 16 of the tape of this invention are those having thermoplastic blocks conventionally designated as A blocks and rubbery blocks conventionally designated as B blocks. Examples of block copolymers having thermoplastic endblocks and rubbery midblocks are designated as A-B-A block copolymers. Each A block can be the same or different.

Thermoplastic-elastomeric block copolymers suitable for the elastomeric component of the layer of pressure-sensitive adhesive 16 of the tape of this invention also include radial block copolymers that are designated $(A-B)_n X$, wherein X represents a polyfunctional atom of the residue of polyfunctional molecule from which each A-B segment radiates in a way that A acts as an endblock. Thermoplastic-elastomeric block copolymers suitable for this invention also include A-B block copolymers, sometimes referred to as "simple" block copolymers, wherein the B block forms on endblock rather than a midblock.

The thermoplastic A block can be selected from polymers such as polyalkenylarenes, preferably of styrene or styrene homologs and analogs, such as, for example, α-methylstyrene, 4-tertiary-butylstyrene, 4-methylstyrene, 3,5-diethylstyrene, 3,5-di-n-butylstyrene, 4-(4-phenyl-n-butyl)styrene, 2-ethyl-4-benzylstyrene, 4-cyclohexylstyrene, 4-n-propylstyrene, 4-dodecylstyrene, vinyltoluene, and the like.

The rubbery B block can be selected from polymers prepared from monomers such as conjugated aliphatic diene, preferably having from 4 to 6 carbon atoms or lower alkenes, preferably having from 2 to 6 carbon atoms. Representative examples of conjugated dienes suitable for B blocks include butadiene, isoprene, 1,3-pentadiene, 1,3-hexadiene, 2,3-dimethyl-butadiene, and the like. The preferred dienes are butadiene and isoprene. Representative examples of alkenes suitable for this invention include ethylene, butylene, propylene, and the like. In both A-B and A-B-A block copolymers, the B blocks are preferably polyisoprene.

The block copolymers can be linear, branched, or radial. A branched copolymer comprises a chain having branches randomly attached thereto. As previously stated, a radial block copolymer has blocks radiating from a central core. In the radial block copolymer $(A-B)_n X$, X represents a polyfunctional atom or an organic or inorganic residue of a polyfunctional molecule and n represents an integer having the same or lesser value as the number of functional groups originally associated with X. The value of n is usually at least 3 and is frequently 4 or 5, and it can be higher.

In the block copolymers suitable for the pressure-sensitive adhesive compositions employed in layer 16 of the tape of this invention, the individual A block portion preferably has a number average molecular weight of at least about 6,000, more preferably ranging from about 8,000 to about 30,000, and the B block portion preferably has a number average molecular weight of at least about 25,000, more preferably ranging from about 45,000 to about 180,000. The A blocks constitute from about 5 to about 40 percent by weight, preferably from about 10 to about 30 percent, of the block copolymer. The number average molecular weight of the block copolymer preferably ranges from about 75,000 to about 200,000 for linear copolymers and preferably ranges from about 125,000 to about 400,000 for radial copolymers. In the A-B copolymers, the number average molecular weight of the A blocks preferably ranges from about 7,000 to about 20,000, and the total molecular weight of the block copolymer preferably does not exceed about 150,000.

Thermoplastic-elastomeric block copolymers suitable for the pressure-sensitive adhesive compositions employed in layer 16 of the tape of this invention can be prepared by stepwise solution polymerization of the components. Methods of preparing block copolymers are described more fully in "Thermoplastic Rubber in Adhesives" by J. T. Harlan et al, *Handbook of Adhesives*, edited by Irving Skeist, Van Nostrand Reinhold Co., New York, Second Edition (1977), pages 304-330;

"Rubber-Related Polymers, I. Thermoplastic Elastomers" by W. R. Hendricks et al, *Rubber Technology*, edited by Maurice Morton, Van Nostrand Reinhold Co., New York (1973), pages 514–533; and U.S. Pat. Nos. 3,281,383; 3,519,585; and 3,787,531.

In an A-B-A block copolymer, when the A block is polystyrene and the B block is a polymer of butadiene, the polymer is frequently referred to as a S-B-S polymer. When the A block is a styrene polymer and the B block is an isoprene polymer, the polymer is frequently referred to as a S-I-S polymer. It is understood that block copolymers designated A-B-A may contain minor amounts A-B copolymers. Many of the block copolymers can be obtained commercially and are useful alone or in blends. Examples of commercially available block copolymers suitable for the pressure-sensitive adhesive layer of this invention are sold under the following trademarks: VECTOR 4113D (linear S-I-S), Dexco Polymers; SOLPRENE 1205 (linear S-B), Fina Oil and Chemical Company; KRATON 1102 (linear S-B-S), KRATON 1107, KRATON 1111, and KRATON 1112 (linear S-I-S), Shell Chemical Company. Additional information relating to A-B-A block copolymers can be found in *Handbook of Pressure Sensitive Adhesive Technology*, Second Edition, edited by Donatas Satas, Van Nostrand Reinhold (New York:1989), pp. 317–373, incorporated herein by reference.

The elastomeric component may include conventional non-block elastomers. These elastomers must exhibit low plasticity and preferably not exceed about 50% by weight of the total elastomeric component. As used herein, "low plasticity" means a Mooney viscosity number of less than 50, preferably less than 35. These conventional elastomers may include highly broken down natural rubbers, polyisoprene rubbers, styrene-butadiene rubbers, chloroprene rubbers, nitrile rubbers, butyl rubbers, and the like. Elastomeric liquid polymers also can be employed as additives, but in lower proportions.

The tackifier resin component of the pressure-sensitive adhesive compositions suitable for use in layer 16 of the tape of this invention comprises at least a major amount of a tackifier resin and may contain a minor amount, i.e., up to 50% by weight of other resins compatible with the elastomeric component. Tackifier resins suitable for use in layer 16 of the tape of this invention include hydrocarbon resins, rosins, hydrogenated rosins, rosin esters, polyterpene resins, and other resins so long as adhesives containing them exhibit the proper balance of properties in the "quickstick", adhesion, and cohesion strength tests as described in "Pressure-Sensitive Tapes and Labels" in C. W. Bemmels, *Handbook of Adhesives*, edited by Irving Skeist, Van Nostrand Reinhold Company (1977), pages 724–735, incorporated herein by reference. The preferred tackifier resins are hydrocarbon resins derived from olefins and diolefins having five carbon atoms. Examples of commercially available tackifier resins suitable for the pressure-sensitive adhesive layer of this invention are sold under the following trademarks: WINGTACK, Goodyear Tire and Rubber Co., PICCOLYTE A, Hercules, Inc. Other resins that can be employed in minor amounts in the tackifier resin component of the adhesive composition include polymers and copolymers of α-methylstyrene, vinyltoluene, and similar aromatic monomers, preferably containing from about 8 to 12 carbon atoms, polymers of coumarone, indene, and related cyclic compounds, and other resins providing internal strength to the overall composition.

The pressure-sensitive adhesive compositions of layer 16 of the tape of this invention may also include some amounts of other materials such as antioxidants, stabilizers, ultraviolet inhibitors, fillers, and the like. Typical antioxidants are tetrakis[methylene 3-(3′,5′-di-tert-butyl-4′-hydroxyphenyl) propionate]methane, 1,3,5-trimethyl-2,4,6-tris(3,5-di-tert-butyl-4-hydroxybenzyl)benzene, 2(4-hydroxy-3,5-tert-butyl-anilino)4,6-bis(n-octyl-thio-1,3,5,triazine), 2,2′-methylenebis-(4-methyl-6-tert-butylphenol), 2,2′-methylenebis(4-ethyl-6-tert-butylphenol), 4,4′-thiobis-(6-tert-butyl-m-cresol), octadecyl 3,5-di-tert-butyl-4-hydroxy hydrocinnamate, tri(nonylated phenyl)phosphite, 3,3′-dilauryl thiodipropionate, and zinc dibutyldithiocarbamate. Antioxidants can be used alone or in combination. Examples of commercially available antioxidants suitable for the pressure-sensitive adhesive layer of this invention are sold under the following trademarks: ETHANOX 376, Ethyl Corp., IRGANOX 1010, Ciba-Geigy Corp., CYANOX LTDF, American Cyanamid Co. Typical ultraviolet inhibitors are octylphenyl salicylate, resorcinol monobenzoate, 2-hydroxy-4-(2-hydroxy-3-methacrylyloxy)-propiobenzophenone, substituted benzotriazole, substituted hydroxyphenyl benzotriazole, hindered amine, 1,3,5-trimethyl-2,4,6-tris(3,5-di-tert-butyl-4-hydroxy benzyl)benzene, octadecyl 3-(3′,5′-di-tert-butyl-4′-hydroxyphenyl)propionate, tetrakis[methylene 3-(3′,5′-di-tert-butyl-4′-hydroxyphenyl)propionate]methane. Examples of commercially available ultraviolet inhibitors suitable for the pressure-sensitive adhesive layer of this invention are sold under the following trademarks: IRGANOX 1076, Ciba-Geigy Corp., TINUVIN P, Ciba Geigy Corp. Conventional heat stabilizers, such as non-volatile phenolic compounds, may also be included. If desired, small amounts of fillers and pigments such as zinc oxide, aluminum hydrates, clay, calcium carbonate, titanium dioxide, carbon black, and the like can be included. The amount of such additives should be sufficiently low such that they do not interfere with the adhesion properties of the adhesive. Antioxidants are typically present in an amount ranging from about 0.3 to about 5.0% by weight of thermoplastic-elastomeric block copolymer. Other additives can be present in greater amounts. Additives for the adhesive composition of this invention are described in greater detail in *Handbook of Pressure Sensitive Adhesive Technology*, Second Edition, edited by Donatas Satas, Van Nostrand Reinhold (New York:1989), pp. 332–335, incorporated herein by reference.

This invention further provides a process for preparing an adhesive tape comprising the steps of:

(1) providing a backing made from a polymeric film, preferably by extruding a molten polymer;

(2) orienting said backing in the machine direction;

(3) applying a layer of low-adhesion backsize composition to one major surface of said oriented backing;

(4) applying a layer of pressure-sensitive adhesive to the major surface of said oriented backing not bearing the layer of low-adhesion backsize composition;

(5) orienting said layer-bearing backing in the transverse direction by heating and cross-stretching said layer-bearing backing in the transverse direction; and (6) winding the machine direction oriented, transverse direction oriented, layer-bearing backing onto a roll.

The machine direction oriented, transverse direction oriented, layer-bearing backing can subsequently be converted to form rolls of pressure-sensitive adhesive tape.

The first step of the process of the invention involves providing a backing made from a polymeric film, preferably by extruding a molten polymer. The temperature at which extrusion is carried out depends on the particular polymer used. The extrusion step can be carried out with equipment and techniques well known to one of ordinary skill in the art. Methods for forming films by means of extrusion are described in *Encyclopedia of Polymer Science and Engineering*, Second Edition, Vol. 7, John Wiley & Sons (1987), pp. 88-96, incorporated herein by reference. Polymeric materials suitable for preparing the backing have been described previously. Typically, the molten polymer, e.g., polypropylene, is extruded to form a backing having a thickness ranging from about 0.09 cm (35 mils) to about 0.23 cm (90 mils). For other polymers, e.g., polyesters, the thickness of the backing can be lower. It is preferred that the backing be formed by casting a molten polymer onto a chilled roll or casting wheel and then quenched, such as, for example, by means of a water bath. For polyesters, a water bath is neither required nor recommended.

The second step of the process involves orienting the backing made from the polymeric film in the machine direction. Orientation of the backing can be accomplished by conventional stretching apparatus. Methods for orienting films in the machine direction are described in *Encyclopedia of Polymer Science and Engineering*, Second Edition, Vol, 7, John Wiley & Sons (1987), pp. 96-98, incorporated herein by reference. The machine direction orientation ratio is dependent upon the material used to prepare the backing. Examples of stretch ratios are about 4 to 1 to about 7 to 1 for polypropylene and about 2 to 1 to about 3 to 1 for polyester (e.g., polyethylene terephthalate).

The third step in the process of this invention involves depositing a layer of a low-adhesion backsize composition on one major surface of the oriented backing. Application of the low-adhesion backsize composition may be carried out by various techniques known to one of ordinary skill in the art, such as by coating, e.g., roll or slot, spraying, and the like. One method of applying the low-adhesion backsize composition to the backing involves spraying the composition onto the backing and then smoothing the composition with a wire-wound rod.

It is preferred that the low-adhesion backsize composition be applied from an aqueous solution or in a solid form, because the cross-stretching step requires that the coated backing be heated. If the low-adhesion backsize composition is applied from an organic solvent, the solvent must be substantially removed before heating and cross-stretching to minimize the risk of fire or explosion. The preferred material for preparing the low-adhesion backsize composition has been described previously.

The low-adhesion backsize composition is deposited in a layer, preferably of uniform thickness, onto the backing, typically at a weight of from about 0.1 to about 0.4 grains/24 in.$^2$ (from about 0.4 to about 1.7 g/m$^2$). The coating weight per unit area will be reduced in the subsequent cross-stretching step.

The fourth step of the process involves applying a layer of pressure-sensitive adhesive to the major surface of the oriented backing not bearing the low-adhesion backsize composition. Pressure-sensitive adhesive compositions suitable for forming this layer have been described previously. Application of the adhesive composition can be accomplished by coating methods that are well known to one of ordinary skill in the art. Hot-melt coating is preferred. Hot-melt coating methods are described in *Handbook of Pressure Sensitive Adhesive Technology*, Second Edition, edited by Donatas Satas, Van Nostrand Reinhold (New York:1989), pp. 792-798, incorporated herein by reference. A hot-melt coating method preferred for this invention employs a contact coating die. As mentioned previously, this step can occur prior to, subsequent to, or at the same time as the layer of low-adhesion backsize composition is applied.

It is preferable to apply the layer of pressure-sensitive adhesive subsequent to the application of the low-adhesion backsize composition. When the low-adhesion backsize composition is applied subsequent to the application of the pressure-sensitive adhesive, evaporation of water from a low-adhesion backsize composition applied by means of an aqueous composition cools the backing, resulting in excessively varying the temperature of the backing. In order to bring about uniform cross-stretching of the backing, it is preferred that the entire backing be at a uniform temperature. Failure to have a uniform temperature over the entire backing results in high regions and low regions of thickness in the pressure-sensitive adhesive tape.

It is important that a sufficient amount of pressure-sensitive adhesive composition be applied to the backing so that a commingled layer comprising material from the pressure-sensitive adhesive and material from the backing will be formed upon completion of the subsequent cross-stretching step. Typically, the layer of pressure-sensitive adhesive is applied to the backing at a coating thickness of about 3 to 20 mils (0.076 to 0.51 mm). It is preferred that the coating be of uniform thickness. The thickness of the coated adhesive layer will be reduced in the subsequent cross-stretching step to the thickness desired in the final product.

The fifth step in the process of this invention involves orienting the layer-bearing backing in the transverse direction by heating and cross-stretching the layer-bearing backing in the transverse direction. One effect of this step is to improve strength of the tape in the transverse, i.e., cross, direction. This step is preferably carried out in a tenter oven. A tenter oven suitable for the process of this invention has, in the following order, (1) one or more preheat regions, (2) one or more cross-stretching regions, and (3) one or more annealing regions. The temperatures of the various regions of the tenter oven should be set such that the bulk temperature of the layer-bearing backing is close, e.g., within 20° C., to the melting point of the polymeric material of the backing. The layer-bearing backing must be heated sufficiently so that the backing will soften sufficiently to allow the layer of pressure-sensitive adhesive and the backing to intermix to form a commingled layer during the cross-stretching operation. It has been discovered that by keeping the bulk temperature of the layer-bearing backing during the cross-stretching step as uniform as possible, the tendency to produce thick spots and thin spots in the layer-bearing backing is minimized. For polypropylene, it has been discovered that by raising the temperature of the pre-heating region or regions of the tenter oven to a level higher than the melting point of the polymeric material of the backing and by maintaining the cross-stretching region or regions of the tenter oven at or near, e.g., within 20° C., the temperature of the melting point of the polymeric material of the backing, improved adhesion between the backing and the layer of pressure-sensitive adhesive can be achieved. Of course, it is imperative that the backing neither melt nor lose its machine direction orientation during the heating and cross-stretching step. Such effects may cause either a reduction in adhesion between the backing and the layer of pressure-sensitive adhesive or loss of adhesive strength in the final product or both. One means for avoiding the melting and loss of machine direction orientation of the backing is by controlling the amount of time the layer-bearing backing resides in the tenter oven.

The cross-stretching ratio is dependent upon the polymeric film backing used. Examples of cross-stretching ratios are about 7 to 1 to about 10 to 1 for polypropylene and about 2 to 1 to about 3 to 1 for polyester (e.g., polyethylene terephthalate).

Methods for cross-stretching are described in *Encyclopedia of Polymer Science and Engineering*, Second Edition, Vol. 7, John Wiley & Sons, (1987), pp. 98-102, incorporated herein by reference. This step causes the low-adhesion backsize composition to flow, coalesce, and form a continuous film, which fuses to the backing. As a result of this heating and cross-stretching step, the thickness of the low-adhesion backsize layer and the thickness of the layer of pressure-sensitive adhesive are reduced. In addition, the heating and cross-stretching step removes odor-causing agents from the tape, thereby providing a tape having little or no odor. Such odor-causing volatile materials as cyclohexane, heptanes, heptenes, xylenes, low molecular weight hydrocarbon fragments from the tackifier resin, e.g., piperylene, 2-methylbutene-2, other hydrocarbon oils such as $C_{10}H_{18}$ isomers, methyl styrene, and limonenes ($C_{10}H_{16}$) are removed. Many of these materials remain in tape prepared by conventional processes.

After the tape is oriented in the transverse direction, it is preferably annealed to minimize shrinkage in both the machine direction and the transverse direction. It is preferred that shrinkage be less than 10%, more preferably less than 5%, and even more preferably less than 3%.

The sixth step of the process involves winding the machine direction oriented, transverse direction oriented, layer-bearing backing onto a roll. The machine direction oriented, transverse direction oriented, layer-bearing backing can subsequently be converted to form rolls of pressure-sensitive adhesive tape suitable for commercial purposes.

The process of this invention provides the following benefits:

(1) improved anchorage of the adhesive layer to the backing. The extent of improvement in anchorage depends on the amount of heat and the duration of exposure to heat under which the cross-stretching step is carried out. In general, the greater the amount of heat and the longer the duration of exposure thereto, the greater is the increase in adhesion, so long as the backing does not melt or lose its machine direction orientation.

(2) greater uniformity in the thickness of the layer of pressure-sensitive adhesive and the thickness of the layer of low-adhesion backsize composition. Uniformity in the thickness of the foregoing layers enhances appearance and consistency in performance of the tape product and the economics of the process.

(3) reduction of odor in the adhesive tape. It is believed that the low boiling organic components that may be responsible for the characteristic odor of some adhesive tapes are removed in the tenter oven. Tape having low odor is desirable because it can be used in food packaging where residual odors are undesirable, and odor can be objectionable to some users.

An additional, optional step in the process of the invention involves converting the machine direction oriented, transverse direction oriented, layer bearing backing by slitting, winding, and the like. Such converting techniques and methods are well known to one of ordinary skill in the art. Methods for converting are described in *Handbook of Pressure Sensitive Adhesive Technology*, Second Edition, edited by Donatas Satas, Van Nostrand Reinhold (New York:1989), pp. 875-890, incorporated herein by reference.

One embodiment of the apparatus useful in this invention is illustrated in FIG. 2. The apparatus 20 includes the following components: extruder 22 having a flat sheet die 24; casting wheel 26, water bath 28; heating rolls 30; nipped drawing rolls 32; machine direction orienter 34; low-adhesion backsize composition applicator 36; contact adhesive coating die 38; tenter over 40; and roll or tape winder 42. The apparatus will be described in greater detail in the working example. In other embodiments (not shown) the layer of low-adhesion backsize composition can be applied prior to or simultaneously with the application of the adhesive layer.

The following non-limiting examples illustrate the tape, the process, and some of the advantages of the present invention.

EXAMPLE 1

Referring to FIG. 2, polypropylene (melt flow index 2.7 g/10 min) was fed into the feed hopper of a single screw extruder 22 having an extruder barrel temperature adjusted to produce a stable homogeneous melt. The polypropylene melt was extruded through a flat sheet die 24 onto a rotating casting wheel 26 which had 60° C. water circulating through it. The casting wheel 26 carried the cast sheet of polypropylene through a quenching water bath 28 maintained at 30° C. at a speed adjusted to produce a 0.15 cm thick cast sheet. The width of the cast sheet of polypropylene was 15.25 cm (6 inches). The cast sheet was then passed over a first series of heating rolls 30 maintained internally at about 127° C. to 136° C. and then stretched between two nipped drawing rolls 32 rotating at difference speeds in the machine direction orienter 34 to attain a first draw ratio of 5.0 to 1 in the direction that would eventually be the longitudinal or machine direction of the backing. Then, an aqueous composition containing a low-adhesion backsize composition having 10% solids by weight, was applied by means of a spray applicator 36 onto one major surface of the backing at a weight of 0.025 grains/24 in.$^2$ (0.1 g/m$^2$). The compound of the low-adhesion backsize composition was a tetrapolymer which had been prepared by polymerizing the monomers acrylic acid, styrene, methylmethacrylate, and

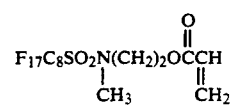

The ratio, based on weight, of the monomeric components was 9% acrylic acid, 15% styrene, 16% methylmethacrylate, and 60% fluorocarbon monomer. The composition also had an inherent viscosity of 0.73 at 24% solids by weight.

Water was removed by evaporation, which was accelerated by means of heat from infrared lamps. The pressure-sensitive adhesive was applied to the backing on the major surface opposite that bearing the low-adhesion backsize composition by means of a contact adhesive coating die 38 maintained at a temperature of 177° C.–205° C. (350°–400° F.) to form a layer of adhesion 0.018 cm (7 mils) thick. The adhesive composition was the same type of adhesive composition as was described in U.S. Pat. No. 3,239,478, incorporated herein by reference, with the exceptions that it contained 100 parts by weight styrene-isoprene-styrene-based (S-I-S) block copolymer containing minor amounts of styrene-isoprene (S-I) block copolymer, 100 parts by weight hydrocarbon tackifier, 1.5 parts by weight 3,3'-dilaurylthiodipropionate, and 1.5 parts by weight octadecyl-3,5-di-tert-butyl-4-hydroxy-hydrocinnamate. The coated backing was then heated by means of forced hot air in the preheating regions of the tenter oven 40 and then fed into the stretching region of tenter oven 40 where it was oriented in the transverse direction by cross-stretching at a stretching ratio of 9 to 1. The temperature of the first preheating region of the tenter oven 40 was 172° C., the temperature of the second preheating region of the tenter oven 40 was 162° C., and the temperature of the stretching region of the tenter oven 40 was 152° C. The temperature of the annealing region of the tenter over 40 was 155° C. Finally, upon exiting the tenter oven 40, the tape was trimmed to a width of 40.6 cm (16 inches), and wound on a roll 42. The speed at which the tape exited the tenter oven 40 was 10 meters/minute.

The force required to peel the layer of pressure-sensitive adhesive from the backing is set forth in Table I. Adhesive transfer is also set forth in Table I. Peel force was determined by the following test method. A strip of tape was applied with the adhesive side in face-to-face contact with a fresh clean surface of an unsealed anodized aluminum test panel, and the tape was rubber down well to assure good adhesive contact. The strip of tape was peeled off at a constant angle of 90° and at a rate of 12 inches (30.5 cm) per minute, and the force required to remove the tape from the test panel was measured. Peeling was carried out with a "Constant Rate of Extension"-type tensile testing apparatus, available from Instron Corporation. The percentage of adhesive remaining on the surface of the test panel was visually observed and designated as Transfer (%) in Table I.

TABLE I

| Example no. | Roll position[1] | Cut[2] | Peel force (Newtons/ 100 mm) | Transfer (%) |
|---|---|---|---|---|
| 1 | 1 | a | 90.8 | 0 |
| | | b | 87.5 | 0 |
| | | c | 87.5 | 0 |
| | 2 | a | 78.8 | 0 |
| | | b | 87.5 | 0 |
| | | c | 67.8 | 0 |
| | 3 | a | 83.1 | 0 |
| | | b | 81.0 | 0 |
| | | c | 83.1 | 0 |
| | 4 | a | 81.0 | 0 |
| | | b | 85.3 | 0 |
| | | c | 85.3 | 0 |

TABLE I-continued

| Example no. | Roll position[1] | Cut[2] | Peel force (Newtons/ 100 mm) | Transfer (%) |
|---|---|---|---|---|
| | 5 | a | 81.0 | 0 |
| | | b | 83.1 | 0 |
| | | c | 85.3 | 0 |

[1]Roll position refers to the position on the 40.6 cm roll from which the sample tape roll was sliced. Assuming that the 40.6 cm roll was stood on one of its bases, i.e., the lower base, roll positions 1 and 5 were sliced from the upper base and lower base of the 40.6 cm roll; roll position 3 was sliced from a position approximately mid-way between the upper and lower bases of the 40.6 cm roll; roll positions 2 and 4 were sliced from portions of the 40.6 cm roll between positions 1 and 3 and positions 3 and 5, respectively. Each slice was coaxial with the roll.
[2]Cut refers to the position of a sample portion cut from one of the five roll slices obtained from the 40.6 cm roll. One sample portion was cut from a position near the beginning of the roll slice, one sample portion was cut from a position near the core of the roll slice; one sample portion was cut from a position intermediate the first two sample portions.

The data in Table I show that the percentage of adhesive remaining on the surface of the test panel was 0% in all cases, which is characteristic of a pressure-sensitive adhesive tape having a commingled layer between the backing and the layer of pressure-sensitive adhesive.

EXAMPLE 2

Example 1 was repeated, with the following exceptions:

| (1) Amount of tackifier in pressure-sensitive adhesive composition | 62 parts by weight |
|---|---|
| (2) Amount of 3,3'-dilaurylthiodipropionate, octadecyl-3,5-di-tert-butyl-4-hydroxyhydrocinnamate in pressure-sensitive adhesive composition | 0.9 part by weight of each |
| (3) Inherent viscosity of low-adhesion backsize composition | 0.84 at 24% solids by weight |
| (4) Temperature of first preheating region of tenter oven | 174° C. |
| (5) Temperature of second preheating region of tenter oven | 173° C. |
| (6) Temperature of stretching region of tenter oven | 164° C. |
| (7) Temperature of first annealing region of tenter oven | 164° C. |
| (8) Temperature of second annealing region of tenter oven | 164° C. |
| (9) Exit speed of tape from tenter oven | 29.3 m/min |
| (10) Width of roll | 127 cm |

Peel force and percentage of adhesive remaining on the test panel were measured according to the procedure described in Example 1 and set forth in Table II. Also set forth in Table II are results of tests measuring peel force and percentage of adhesive remaining on the test panel for a pressure-sensitive adhesive tape prepared by a conventional method. The conventionally prepared pressure-sensitive tape was prepared by a process comprising the steps of (1) providing a biaxially-oriented polymeric backing; (2) corona treating the major surfaces of the backing to improve the adhesion of the backing to subsequently applied coatings; (3) applying a layer of pressure-sensitive adhesive to one major surface of the backing; (4) applying a layer of low-adhesion backsize composition to the other major surface of the backing; and (5) winding the coated backing onto a jumbo roll. The backing employed was made of substantially the same material and had substantially the same thickness and orientation ratios as the tape of Example 2. The low adhesion backsize composition employed was substantially similar to that described in U.S. Pat. No. 2,532,011. The pressure-sensitive adhesive composition employed was substantially similar to that described in Example 2 and was applied at substantially the same thickness as described in Example 2.

TABLE II

| Example no. | Roll[1] | Slice[2] | Peel force (Newtons/ .100 mm) | Transfer (%) |
|---|---|---|---|---|
| 2 | 1 | a | 118.2 | 0 |
|   |   | b | 122.5 | 0 |
|   |   | c | 126.9 | 0 |
|   | 2 | a | 113.8 | 0 |
|   |   | b | 123.6 | 0 |
|   |   | c | 142.2 | 0 |
|   | 3 | a | 126.9 | 0 |
|   |   | b | 126.9 | 0 |
|   |   | c | 142.2 | 0 |
| Comparative A | 1 | a | 67.8 | 100 |
|   |   | b | 70.0 | 100 |
|   |   | c | 67.8 | 100 |

[1]Roll refers to the particular 127 cm roll from which the test samples were drawn.
[2]Slice refers to a randomly selected portion of the roll from which a smaller roll was sliced. Each slice was coaxial with the roll. The particular sample of a slice tested was cut from a portion of the slice intermediate to the portions at the beginning of the slice and at the core of the slice.

The data in Table II show that in the tape of Example 2, no adhesive remains on the surface of the test panel, but that in the tape of Comparative Example A, 100% of the adhesive remains on the test panel. Furthermore, the tape of Example 2 has a commingled layer between the backing and the layer of pressure-sensitive adhesive. The tape of Comparative Example A has no such commingled layer. The presence or absence of such a commingled layer can be verified through the use of photomicrographs.

Various modifications and alterations in this invention will become apparent to those skilled in the art without departing from the scope and spirit of this invention, and it should be understood that this invention is not to be unduly limited to the illustrative embodiments set forth herein.

What is claimed is:

1. A process for preparing a pressure-sensitive adhesive tape comprising the steps of:
   (1) providing a backing made from a polymeric film;
   (2) orienting said backing in the machine direction;
   (3) applying a layer of low-adhesion backsize composition to one major surface of said oriented backing;
   (4) applying a layer of pressure-sensitive adhesive to the major surface of said oriented backing not bearing the layer of low-adhesion backsize composition, the amount of said adhesive being sufficient to allow intermixing of said layer of pressure-sensitive adhesive and said backing upon cross-stretching of said layer-bearing backing;
   (5) orienting said layer-bearing backing in the transverse direction by heating and cross-stretching the layer-bearing backing in the transverse direction, provided that said layer-bearing backing is heated sufficiently to allow sufficient softening thereof so that said backing and said layer of pressure-sensitive adhesive can intermix during cross-stretching, further provided that said layer-bearing backing is not heated so excessively that said backing melts or loses its orientation in the machine direction during cross-stretching; and
   (6) winding the machine direction oriented, transverse direction oriented, layer-bearing backing onto a roll.

2. The process of claim 1, wherein the layer of low-adhesive backsize composition is applied prior to the application of the layer of pressure-sensitive adhesive.

3. The process of claim 1, wherein the layer of low-adhesion backsize composition is applied subsequent to the application of the layer of pressure-sensitive adhesive.

4. The process of claim 1, wherein the layer of low-adhesion backsize composition is applied at the same time as the application of the layer of pressure-sensitive adhesive.

5. The process of claim 1, wherein said low-adhesion backsize composition is substantially free of organic solvent.

6. The process of claim 1, wherein said low-adhesion backsize composition is applied from an aqueous solution.

7. The process of claim 1, wherein said low-adhesion backsize composition is applied in a solid form.

8. The process of claim 1, wherein said low-adhesion backsize composition is applied from an aqueous emulsion of a copolymer of monomers comprising:
   (1) at least one monomer having the structure:

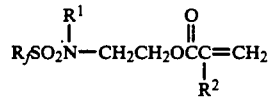

wherein $R_f$ represents a perfluoroalkyl group containing 5 to 12 carbon atoms, $R^1$ represents a lower alkyl radical containing 1 to 5 carbon atoms, and $R^2$ represents H or methyl; and
   (2) at least on substantially unsaturated polar functional monomer.

9. The process of claim 8, wherein said copolymer further contains units from at least one vinyl-functional monomer.

10. The process of claim 8, wherein said low-adhesion backsize composition is applied from an aqueous emulsion of a copolymer comprising 100 parts by weight of monomers comprising:
    (1) from about 30 to about 90 parts by weight of at least one monomer having the structure:

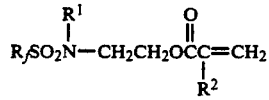

wherein $R_f$ represents a perfluoroalkyl group containing 5 to 12 carbon atoms, $R^1$ represents a lower alkyl radical containing 1 to 5 carbon atoms, and $R^2$ represents H or methyl; and
    (2) from about 70 to about 10 parts by weight of at least one ethylenically unsaturated polar functional monomer.

11. The process of claim 10, wherein said copolymer further contains from about 5 to about 60 parts by weight of at least one vinyl-functional monomer.

12. The process of claim 1, wherein said polymeric film backing is formed by means of extrusion of a molten polymer.

13. The process of claim 1, wherein said cross-stretching step is conducted in a tenter oven.

14. The process of claim 13, wherein the temperature of the pre-heat region of the tenter oven exceeds the melting point of the backing.

15. The process of claim 13, wherein the temperature of the stretching region of the tenter oven is maintained at a temperature that is within 20° C. of the melting point of the backing.

16. The process of claim 1, wherein said backing is a member of the group consisting of polyethylene, polypropylene, polystyrene, polyester, poly(vinyl chloride), and thermoplastic block copolymers.

17. The process of claim 1, wherein said backing is a member of the group consisting of polypropylene blended with small amounts of other polyolefin and copolymers of propylene and other alpha-olefins.

18. The process of claim 1, wherein said pressure-sensitive adhesive comprises an elastomeric component and a tackifier resin component.

19. The process of claim 18, wherein said elastomeric component comprises at least one thermoplastic-elastomeric block copolymer.

20. The process of claim 1, further including the step of converting said machine direction oriented, transverse direction oriented, layer-bearing backing to form a tape.

* * * * *

UNITED STATES PATENT AND TRADEMARK OFFICE
CERTIFICATE OF CORRECTION

PATENT NO. : 5,145,718
DATED : September 8, 1992
INVENTOR(S) : Pedginski et al.

It is certified that error appears in the above-identified patent and that said Letters Patent is hereby corrected as shown below:

Col. 3, line 52, "illustrate" should be --illustrates--.
Col. 3, line 53, "form" should be --from--.
Col. 4, line 40, "polymer" should be --polar--.
Col. 5, line 27, "164°F" should be --165°F--.
Col. 6, line 1, the first instance of "of" should be --or--.
Col. 7, line 4, "514" should be --515--.
Col. 8, line 22, "LTDF" should be --LTDP--.

Signed and Sealed this

Twelfth Day of April, 1994

Attest:

BRUCE LEHMAN

Attesting Officer

Commissioner of Patents and Trademarks